(12) United States Patent
Hu et al.

(10) Patent No.: US 8,483,089 B2
(45) Date of Patent: Jul. 9, 2013

(54) SERVER, METHOD AND SYSTEM FOR PROVIDING NODE INFORMATION FOR P2P NETWORK

(75) Inventors: Yan Hu, Beijing (CN); Yong Xia, Beijing (CN); Yongqiang Liu, Beijing (CN); Quan Huang, Beijing (CN)

(73) Assignee: NEC (China) Co., Ltd., Beijing (CN)

( * ) Notice: Subject to any disclaimer, the term of this patent is extended or adjusted under 35 U.S.C. 154(b) by 0 days.

(21) Appl. No.: 13/000,981

(22) PCT Filed: Jun. 21, 2010

(86) PCT No.: PCT/CN2010/000899
§ 371 (c)(1),
(2), (4) Date: May 13, 2011

(87) PCT Pub. No.: WO2011/000209
PCT Pub. Date: Jan. 6, 2011

(65) Prior Publication Data
US 2012/0124226 A1 May 17, 2012

(30) Foreign Application Priority Data

Jun. 29, 2009 (CN) .......................... 2009 1 0151035

(51) Int. Cl.
*H04W 16/02* (2009.01)

(52) U.S. Cl.
USPC .......................................... 370/254; 709/228

(58) Field of Classification Search
USPC .......................... 709/226, 228, 223, 224, 256
See application file for complete search history.

(56) References Cited

U.S. PATENT DOCUMENTS

| | | | |
|---|---|---|---|
| 7,930,311 B2 * | 4/2011 | Feng et al. | 707/758 |
| 2005/0243740 A1 * | 11/2005 | Chen et al. | 370/256 |
| 2007/0050497 A1 * | 3/2007 | Haley et al. | 709/224 |
| 2009/0006593 A1 * | 1/2009 | Cortes | 709/223 |
| 2009/0144422 A1 * | 6/2009 | Chatley et al. | 709/226 |

* cited by examiner

*Primary Examiner* — Andrew Lai
*Assistant Examiner* — Zhiren Qin
(74) *Attorney, Agent, or Firm* — Sughrue Mion, PLLC

(57) ABSTRACT

The invention provides a server, a method and a system for providing node information for P2P network. A server in a peer-to-peer (P2P) network comprises: a location information storage unit which stores coordinate information indicating a coordinate of each data node in the P2P network in a coordinate system that is created based on communication delays among data nodes in the P2P network; and a node information providing unit which, upon receipt of a request for information on data nodes having a first data item, selects one or more data nodes from data nodes having the first data item based on the coordinate information, and provides information indicating the selected one or more data nodes.

13 Claims, 12 Drawing Sheets

SERVER, METHOD AND SYSTEM FOR PROVIDING NODE INFORMATION FOR P2P NETWORK

FIELD OF THE INVENTION

The invention relates to peer-to-peer (P2P) technique, and more specifically to a server, method and system for providing node information for a P2P network.

BACKGROUND

P2P technique is a hot topic in the field of Internet application these years. It provides a new and efficient way for Internet users to share resources. Node selection is a key issue in P2P network. When a data node wants to exchange a resource (i.e., data item) with other data nodes, it may issue a request to a server in the P2P network. The server may find the data nodes having this resource, and select some nodes therefrom to return to the requester. Then the requester may download the desired resource directly from these nodes.

The existing P2P system usually selects some nodes in random from nodes having a resource. Such a method cannot make efficient use of the network. For example, tremendous network traffic goes through the backbone of the Internet Service Provider (ISP), which imposes a large transmission load on the backbone. Or, network traffic is frequently transmitted cross ISP's, which results in a lot of cross-network (cross-ISP) traffic. Furthermore, such a method also affects the quality and performance of the service provided, because even if there are nodes with low communication delay in the P2P network, the random node selection mechanism may select other nodes having high communication delay.

To solve this problem, a new P2P system based on location information has been proposed. When making node selection, this method will preferentially select "adjacent" nodes. The problem with the random node selection mechanism is solved by selecting adjacent nodes. Thus, the network is efficiently used, cross-network traffic is reduced, and application performance is improved.

In Chinese Patent Application Publication CN101018172A entitled "Method for Optimizing P2P Transmission within Metropolitan Area Network" published on Aug. 15, 2007 (Document 1), an optimized method for P2P applications for a metropolitan area network is disclosed. In Document 1, by adding topology servers and indexing servers, attempt is made to restrict P2P traffic to occur at the edge of the network to reduce the transmission load on the backbone and hence avoid network congestion caused by P2P.

In P4P: Provider Portal for Applications, Haiyong Xie, Y. Richard Yang, Arvind Krishnamurthy, Yanbin Liu, Avi Silberschatz, in Sigcomm 2008 (Document 2), a new architecture called P4P is proposed, which enables more efficient cooperation between a P2P application and the ISP for controlling network traffic. This mechanism can reduce cost of the ISP, while maintaining or even improving performance of an existing P2P application.

In Chinese Patent Application Publication CN101237467A entitled "Mobile P2P Network Resource Discovering Method Introducing Vector Locating" published on Aug. 6, 2008 (Document 3), a mobile P2P network resource discovering method which introduces vector locating is disclosed. In this method, a polar coordinate locating theory is introduced to divide the entire cellular network by home region, distance and direction and establish a new routing table containing location vector information, to thereby enable quick and accurate locating for a cellular network and bi-directional look-up of resources.

FIG. 1 shows the structure of the metropolitan area network described in Document 1. As a data node in a P2P network, a user computer generally first accesses a building switch, then connects to a cell switch, then connects to an access layer switch or router (referred to as "access switch" hereinafter), in turn accesses an aggregation layer switch or router (referred to as "aggregation switch" hereinafter), and finally connects to a core switch or router. A core network of the metropolitan area network is generally constituted of one or more core switches or routers. Typically, a building switch constitutes a subnet.

The optimized method for P2P transmission within the metropolitan area network in Document 1 includes: 1) when a P2P node wants to download a resource (this node is called requesting P2P node), querying for a list of P2P nodes having this resource through a P2P indexing server (these nodes are called resource P2P nodes); 2) finding nodes most adjacent to the requesting P2P node on the network from the resource P2P nodes; and 3) downloading the resource from the one or more most adjacent resource P2P nodes on the network by the requesting P2P node.

The algorithm for selecting adjacent nodes for the requesting P2P node is as follows: first selecting nodes attached to the same building switch as the requesting P2P node, then selecting nodes attached to the same cell switch as the requesting P2P node, then selecting nodes attached to the same access switch as the requesting P2P node, and next selecting nodes attached to the same aggregation switch as the requesting P2P node. If the number of the selected nodes is less than the requested number, then all the nodes having the resource are considered as adjacent nodes. This method makes P2P traffic be as far from the core network as possible and be transmitted at the edge of the network, and thus reduces P2P traffic flowing through backbone networks such as core networks and aggregation networks.

To find adjacent nodes, the switches or routers in the metropolitan area network need to be coded. As shown in FIG. 1, s1 is the code for an aggregation switch, the value of which is from 1 to n1; s2 is the code for an access switch, the value of which is from 1 to n2; s3 is the code for a cell switch, the value of which is from 1 to n3; and s4 is the code for a building switch, the value of which is from 1 to n4. The codes for the switches or routers gone through on the way from the core network to each computer constitute the location vector (location information) of the computer: S=(s1, s2, s3, s4).

The calculation method for finding adjacent nodes is as follows. The location vectors of two nodes are defined as S=(s1, s2, s3, s4) and S'=(s1', s2', s3', s4') respectively. Then, the distance vector D between these two nodes is:

$$\begin{aligned} D &= (d1, d2, d3, d4) \\ &= (s1, s2, s3, s4) - (s1', s2', s3', s4') \\ &= (s1 - s1', s2 - s2', s3 - s3', s4 - s4'), \end{aligned}$$

where when si=si', di=0, and when si≠si', di=1.

The method for comparing the sizes of two distance vectors D=(d1, d2, d3, d4) and D'=(d1', d2', d3', d4') is defined as:
when d1=d1', d2=d2', d3=d3', and d4=d4', D=D';
when d1=1 and d1'=0, or
d1=d1', d2=1, and d2'=0, or
d1=d1', d2=d2', d3=1, and d3'=0, or
d1=d1', d2=d2', d3=d3', d4=1, and d4'=0, D>D'.

The smaller the distance vector D is, the more adjacent the two nodes are on the network.

The location information table in the topology server stores the topology information of the metropolitan area network, as shown in Table 1.

TABLE 1

Location Information Table

| Subnet IP Address | Aggregation Switch Code s1 | Access Switch Code s2 | Cell Switch Code s3 | Building Switch Code s4 |
|---|---|---|---|---|
| ... | ... | ... | ... | ... |
| 10.30.11.65/26 | 2 | 3 | 5 | 4 |
| 10.30.11.129/26 | 2 | 3 | 5 | 5 |
| ... | ... | ... | ... | ... |

In Document 1, location information of a computer in a P2P network is expressed by the specific physical location of the computer in the metropolitan area network by coding the switches or routers in the metropolitan area network and constituting the location vector of the computer by the codes of the switches and routers gone through on the way from this computer to the core network. Such expression will be called as hierarchical-coding-based location information expression hereinafter.

This hierarchical-coding-based location information expression is limited in terms of both accuracy and scalability.

Accuracy means whether the nodes returned by the system are indeed the nodes "adjacent" on the network and whether node selection thus made can not only improve application performance but also make more efficient use of the network. For example, in the hierarchical coding method employed in Document 1, when a plurality of nodes are on the same level of the tree, the distances between these nodes and the requesting node cannot be compared. In the example shown in FIG. 1, if a node under an access switch requests for 10 nodes having a data item, and there are 4 nodes under this access switch having this data item, then these 4 nodes are selected as adjacent nodes. There are still 96 nodes having this data item under the aggregation switch to which the access switch belongs, and the distances between these 96 nodes and the requesting node cannot be compared by the hierarchical coding method, although some of the nodes are more adjacent on the network to the requesting node.

Scalability means whether the system can be conveniently extended to a network of a larger scale or even the entire Internet. The hierarchical-coding-based location information expression method is suitable for a metropolitan area network in which topology information is completely known (i.e., a metropolitan area network in which it is known through which switches or routers each computer is connected to the core network). However, it is not easy to extend this method to a larger network or even the entire Internet, because in a larger network it is very difficult to know topology information of all parts of the network.

In addition, hierarchical coding typically requires to make pre-setting as to how many levels are used to express location information and what information is expressed by each level. For example, in the method of Document 1, location information is expressed by four levels of aggregation switch, access switch, cell switch and building switch. This also restricts the flexibility and scalability of this method.

SUMMARY OF THE INVENTION

To solve the above and other problems, the invention provides a server in a P2P network, a method for providing node information in a P2P network, and a system for providing node information in a P2P network, which can accurately provide node information based on location information and have high flexibility and scalability.

According to an aspect of the invention, there is provided a server in a peer-to-peer (P2P) network, comprising: a location information storage unit which stores coordinate information indicating a coordinate of each data node in the P2P network in a coordinate system that is created based on communication delays among data nodes in the P2P network; and a node information providing unit which, upon receipt of a request for information on data nodes having a first data item, selects one or more data nodes from data nodes having the first data item based on the coordinate information stored in the location information storage unit, and provides information indicating the selected one or more data nodes.

According to another aspect of the invention, there is provided a method of providing node information in a peer-to-peer (P2P) network, comprising the steps of: receiving a request for information on data nodes having a first data item; selecting one or more data nodes from data nodes having the first data item based on coordinate information; and providing information indicating the selected one or more data nodes, wherein the coordinate information indicates a coordinate of each data node in the P2P network in a coordinate system that is created based on communication delays among data nodes in the P2P network.

According to another aspect of the invention, there is provided a system for providing node information in a peer-to-peer (P2P) network, comprising: a data node including: a node information requesting unit which sends to a server a request for information on data nodes having a first data item; and a data exchanging unit which exchanges the first data item with data nodes indicated in the information provided by the server; and the server including: a location information storage unit which stores coordinate information indicating a coordinate of each data node in the P2P network in a coordinate system that is created based on communication delays among data nodes in the P2P network; and a node information providing unit which, upon receipt of the request for the information on the data nodes having the first data item from said data node, selects one or more data nodes from data nodes having the first data item based on the coordinate information stored in the location information storage unit, and provides information indicating the selected one or more data nodes to said data node.

Other objectives, features and advantages of the invention will be apparent from the detailed description below in connection with accompanying drawings.

DETAILED DESCRIPTION

Some terms used herein will be explained first.

P2P Network: also referred to as P2P system. A P2P network may include an indexing server (also referred to as Tracker or appTracker), a topology server (also referred to as iTracker), and a plurality of data nodes conducting data exchange. These data nodes are peers to each other. Note that indexing server and topology server are only logical categories, and can be collectively called servers.

Data Node: also referred to as node or host. It is a user (machine) in a P2P network. A data node is an entity that stores the whole or part of one or more actual data items. A data node may have a data item, and/or download a data item from (exchange a data item with) other nodes (peers) in the P2P network. A data node may be an information processing apparatus, such as a personal computer (PCs), a mobile phone, a personal digital assistance (PDA), and the like, which is capable of storing data and communicating with other network nodes over a network.

Peer: data nodes in a P2P system are peers to each other.

Data Item: also referred to as data, resource, data file, or the like. A data item is a resource shared between data nodes in a P2P network, such as an audio file, a video file, a text file, and the like.

Node Information: information that is provided by a server and indicates all or part of the nodes having a data item D.

Location Information: as used in the invention, location information includes coordinate information indicating a coordinate of each data node in a coordinate system according to the invention.

Data Information: information that is reported by a data node to the server and indicates that the data node has a data item D.

Performance Information: information that is fed back by a data node to the server during or after data exchange and indicates condition (such as communication delay, bandwidth, or the like) of data exchange.

A P2P network may include a plurality of data nodes. Explanation will be given below by taking a specific data node P (the data node 10 as described below) among these data nodes as example. As will be appreciated by those skilled in the art, other data nodes in the P2P network may have the same or similar structure as data node P, and can interact with the server in the same or similar manner as data node P.

The embodiments of the invention will be described below with reference to the accompanying drawings. Note that the same or similar reference signs are used throughout the specification and accompanying drawings to indicate the same or similar elements. Repeated description of the same element will be omitted sometimes.

Figure 1:
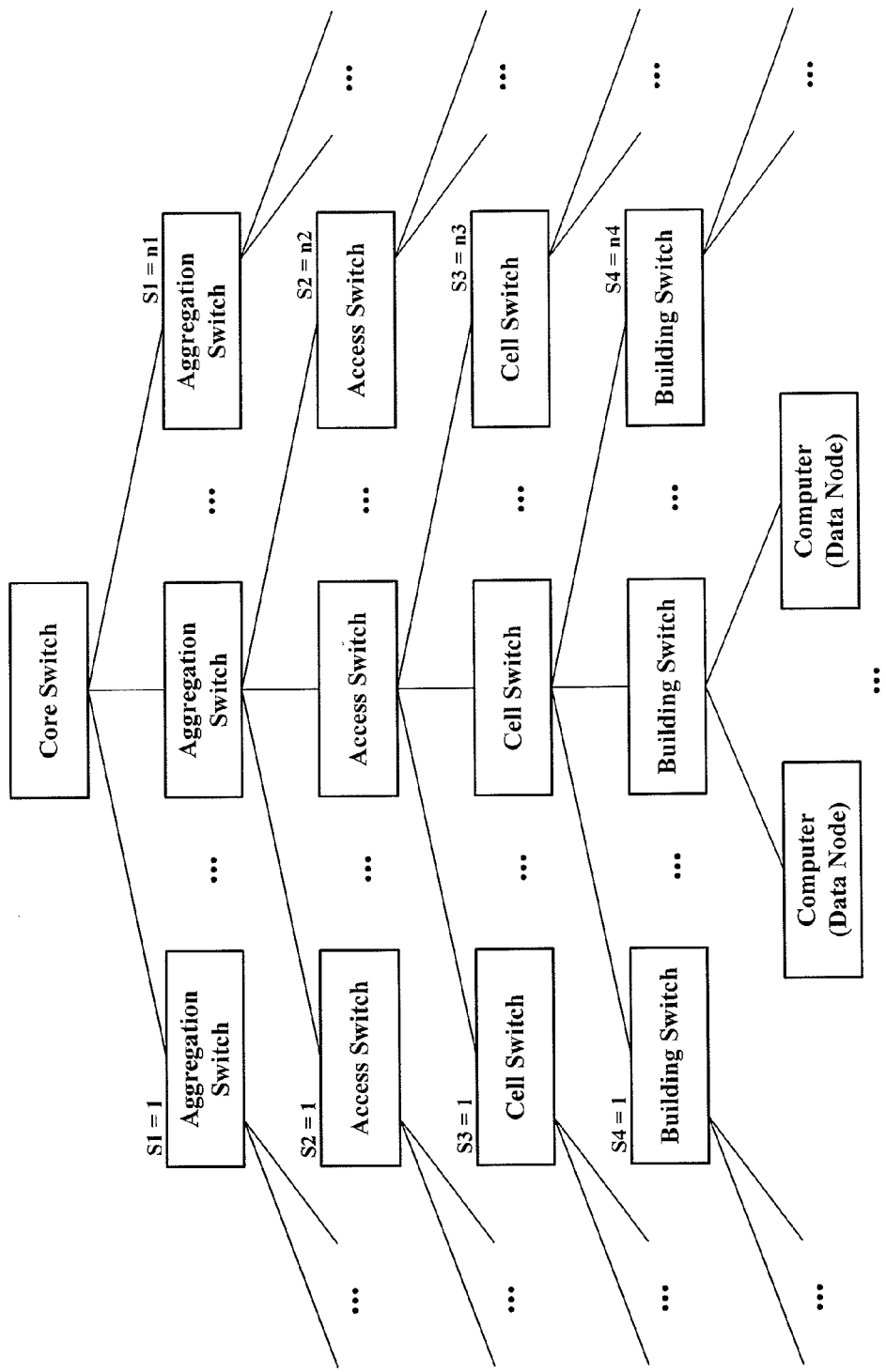
FIG. 1 shows a schematic diagram of a hierarchical coding method of the prior art.
Figure 2:
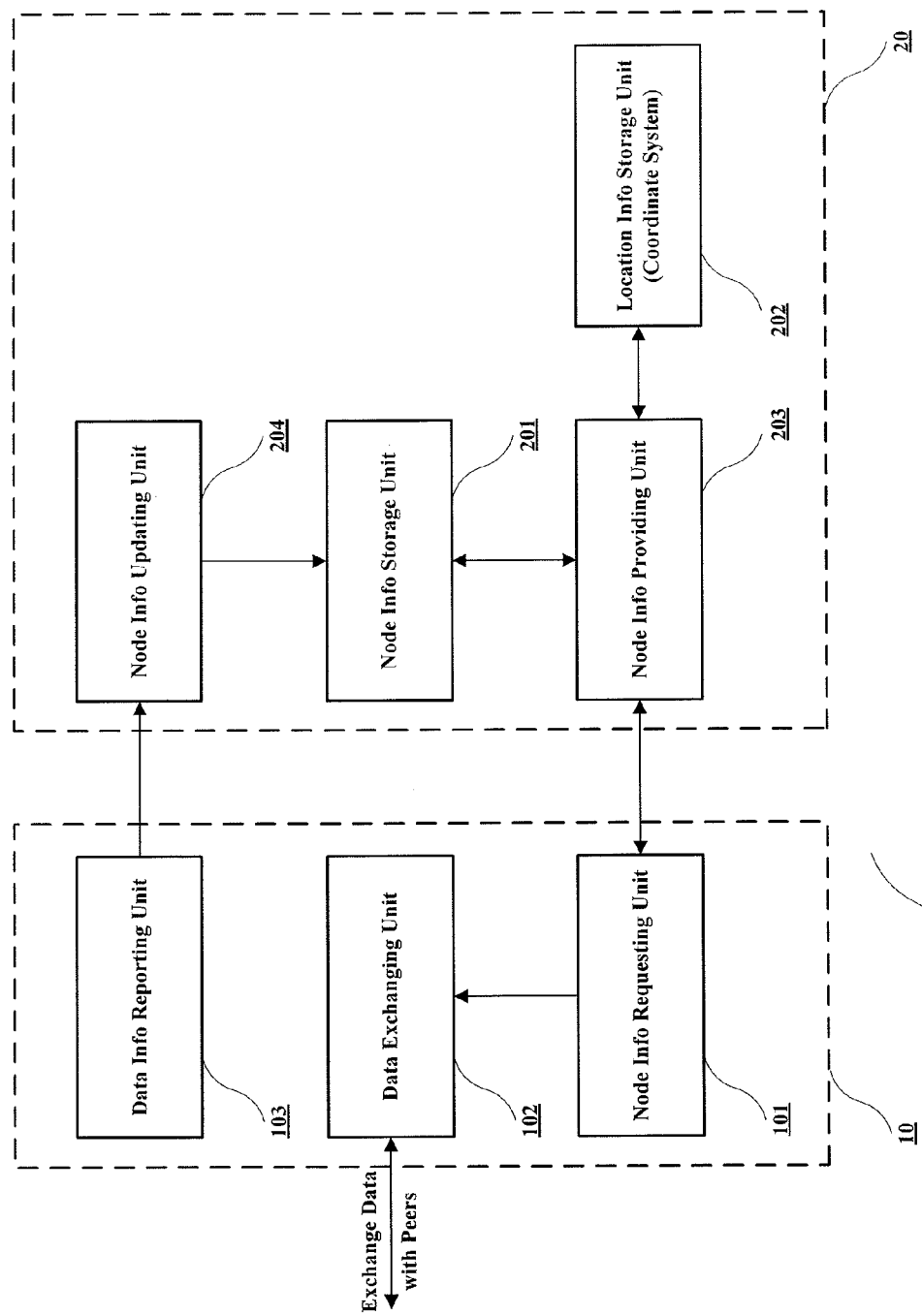
FIG. 2 shows a block diagram of a system according to a first embodiment of the invention.

FIG. 2 shows a block diagram of a system 1 according to a first embodiment of the invention. As shown in FIG. 2, the system 1 comprises a data node 10 and a server 20.

The data node 10 herein represents an exemplary data node P in a P2P network, which includes a node information requesting unit 101, a data exchanging unit 102, and a data information reporting unit 103.

The server 20 includes a node information storage unit 201, a location information storage unit 202, a node information providing unit 203, and a node information updating unit 204.

When the data node 10 wants to download a data item D1 from other data nodes (i.e., peers) in the P2P network, it first needs to know which data nodes in the P2P network have the data item D1. To this end, the node information requesting unit 101 of the data node 10 sends a node information request to the server 20 for acquiring information on data nodes having the data item D1. Note that the "having a data item" herein means having at least part of a data item available for download.

The node information storage unit 201 of the server 20 stores node information for all the data items shared in the P2P network, which indicates which nodes store a particular data item. In other words, for each of the data items shared among data nodes in the P2P network, the stored node information indicates all the data nodes in the P2P network that have the data item. For example, the node information storage unit 201 may store node information as a node information table as shown below.

TABLE 2

| Node Information Table | |
|---|---|
| Data | Node |
| D1 | $P_1$ |
| D1 | $P_2$ |
| D1 | ... |
| D2 | $P_2$ |
| D2 | $P_3$ |
| D2 | ... |
| D3 | ... |

The location information storage unit 202 stores location information. Specifically, the location information of the invention includes coordinate information indicating a coordinate of each data node of the P2P network in a coordinate system according to the invention. This coordinate system is created based on communication delays among at least some of the data nodes in the P2P network. In other words, the location information storage unit 202 stores the location information of all the nodes in the entire P2P network as coordinates. This is different from the hierarchical-coding-based location information expression of Document 1. The location information expression according to the invention will be described in detailed below.

In the invention, a multidimensional Euclidean coordinate system is established according to communication delays among data nodes known in the P2P network, and coordinates are assigned to data nodes to predict communication delays among any nodes. The predicted communication delays among nodes express their degree of adjacency on the network, such that a requesting node may preferentially select adjacent nodes for downloading a data item.

In the coordinate system according to the invention, each data node in the Internet is represented by a point in a coordinate space. For example, taking a three-dimensional Euclidean space as example, a coordinate of node P is $C_p = (x_p, y_p, z_p)$. The distance between two nodes is expressed by the Euclidean distance between points representing the two data nodes in the space. For example, the distance d between a node P having a coordinate of $(x_p, y_p, z_p)$ and a node Q having a coordinate of $(x_q, y_q, z_q)$ is:

$$d=\sqrt{(x_p-x_q)^2+(y_p-y_q)^2+(z_p-z_q)^2}$$

The smaller the distance d is, the more adjacent the two nodes are.

The location information storage unit 202 may store the location information as a location information table. The location information table stores the coordinate information for nodes in the P2P network, as shown in the Table 3 below.

TABLE 3

Location Information Table

| Node ID | Subnet IP Address | Coordinate C = (x, y, z) |
|---|---|---|
| P | 129.3.1.0/24 | (10, 20, 30) |
| $P_1$ | 202.30.11.0/24 | (15, 15, 30) |
| $P_2$ | 166.134.3.0/24 | (25, 35, 40) |
| ... | ... | ... |

Note that the node IDs above are merely examples.

A coordinate system may be created based on communication delays among data nodes in the P2P network. Assume that there are M data nodes $\{H_1, \ldots, H_M\}$ in the P2P network, where M is an integer larger than 1. The communication delay between nodes $H_i$ and $H_j$ is measured and distance $L_{ij}$ is derived based thereon. All the $L_{ij}$'s constitute an M*M matrix. The objective herein is to calculate a coordinate $\{C_1, \ldots, C_M\}$ for each data node such that the cumulative error between the distance based on the measured communication delay (i.e., $L_{ij}$) and the distance calculated by the Euclidean space coordinate (designated as $d_{ij}$) is minimized, that is, to minimize the following objective function F:

$$F = \sum_{H_i, H_j \in \{H_1, \ldots, H_M\}} Err(L_{ij}, d_{ij})$$

where Err( ) is an error function. For example, the following error function may be selected:

$$Err(L_{ij}, d_{ij}) = (L_{ij}-d_{ij})^2$$

With the $L_{ij}$ matrix, coordinate calculation is an optimization problem. This problem can be approximately solved by existing researches, such as the spring forces method described in Vivaldi: A Decentralized Network Coordinate System, Frank Dabek, etc, in sigcomm 2004 (Document 4) and the simplex downhill method described in Predicting Internet Network Distance with Coordinates-Based Approaches, T. S. Eugene Ng etc, in Infocom 2002 (Document 5).

In practice, when the coordinate system is initially established, communication delays can only be measured among some of the nodes, because the cost of an extensive network measurement is huge. That is, in the M*M matrix formed by $L_{ij}$'s, many $L_{ij}$'s do not have a value. During the process of running the system, more communication delay information is measured and acquired. The specific method for building the coordinate system (calculating a coordinate value C for each node) is as follows (taking the spring forces in Document 4 as example):

(1) Choose I landmark nodes $\{K_1, \ldots, K_I\}$, which have the following two features, from the M nodes $\{H_1, \ldots, H_M\}$ of the system:

a. these nodes $K_i, 1 \leq i \leq I$ have communication delay value measured with as many other nodes $H_j, 1 \leq j \leq M$ as possible, that is, have distance $L_{ij}$ measured with as many other nodes $H_j, 1 \leq j \leq M$ as possible, or, in other words, have as many neighbors as possible;

b. these nodes are as dispersive in the coordinate space as possible. This is specifically reflected by the fact that the distance $(L_{ij})$ between $K_i, 1 \leq i \leq I$ and $K_j, 1 \leq j \leq I$ is as large as possible;

(2) Calculate a coordinate $C(K_i)$ for the I landmark nodes $K_i, 1 \leq i \leq I$ by the spring forces method of Document 4 using the measured-communication-delay-based distance $L_{ij}$ among the I landmark nodes;

(3) Calculate a coordinate for other R=M−I nodes $\{N_1, \ldots, N_R\}$. For each node $N_i$:

a. calculate a coordinate $C_I$ for this node using the measured-communication-delay-based distance $L_{ij}$ between this node $N_i$ and I landmark nodes $K_j, 1 \leq j \leq I$ by the spring forces method of Document 4; and then b. update $C_I$ using the measured-communication-delay-based distance $L_{ij}$ between those nodes closer to (having a smaller $L_{ij}$ with) this node and this node $N_i$ by the spring forces method of Document 4, to derive the accurate location of this node in the coordinate space, i.e., the coordinate $C(N_i)$ of $N_i$.

Returning to FIG. 2, upon receipt of the node information request from the data node 10, the node information providing unit 203 selects, based on the coordinate information stored in the location information storage unit 202, one or more data nodes from the data nodes having the data item D1 as indicated by the node information stored in the node information storage unit 201, and provides information indicating the selected one or more data nodes to the data node 10.

Specifically, upon receipt of the request, the node information providing unit 203 searches for all the data nodes having the data item D1 in the node information storage unit 201, for example, T nodes $\{P_1, \ldots, P_T\}$. Then, the node information providing unit 203 finds the coordinate of each of these data nodes $\{P_1, \ldots, P_T\}$ having the data item D1 and the coordinate of the data node 10 in the location information storage unit 202 by using for example node ID's or subnet IP addresses of the nodes. Then, the node information providing unit 203 calculates the distance between each data node having the data item D1 and the data node 10 based on the coordinates found. Then, the node information providing unit 203 selects some of the data nodes from all the data nodes having the data item D1 in ascending order of the calculated distances, for example S nodes $\{P_{i1}, \ldots, P_{iS}\}$, or the like. In the invention, the number S of the selected data nodes may be predetermined or may be specified by the data node 10 or the server 20 as desired. Alternatively, a condition that "the distance is smaller than a predetermined threshold" may be set, such that all the data nodes satisfying the condition will be selected. These are all well known to those skilled in the art. These selected data nodes are data nodes most adjacent to the data node 10. The node information providing unit 203 then notifies the data node 10 of the selected adjacent data nodes.

The node information requesting unit 101 in the data node 10, upon receipt of the information notified from the server 20, communicates the information to the data exchanging unit 102. The data exchanging unit 102 then downloads the data item D1 from (or, exchanges the data item D1 with) the adjacent data nodes indicated in the information provided by the server 20.

In addition, as shown in the figure, the data node 10 (i.e., node P) also includes a data information reporting unit 103. When the data node 10 has a data item D2 that can be exchanged with other data nodes in the P2P network, in order for the server 20 and other data nodes in the P2P network to learn this information, the data information reporting unit 103 reports to the server 20 the data information indicating that data node 10 has the data item D2, such as {D2:P}.

Accordingly, the server 20 also includes a node information updating unit 204. The node information updating unit 204, upon receipt of the data information reported by the data information reporting unit 103 in the data node 10, adds the received information (such as {D2:P}) to the node information stored in the node information storage unit to update the node information. For example, the node information table added with this information is as shown by the Table 4 below (the added entry is shown in bold).

TABLE 4

Node Information Table

| Data | Node |
|------|------|
| D1 | $P_1$ |
| D1 | $P_2$ |
| D1 | ... |
| D2 | P |
| D2 | $P_2$ |
| D2 | $P_3$ |
| D2 | ... |
| D3 | ... |

As described above, establishment of the coordinate system according to the invention does not require knowledge of geographic location information (such as which country or city this node is located at) and other network topology information (such as the switches or routers gone through on the way from the user computer to the core network) of the data node. Rather, coordinates of nodes are determined according to the measured communication delay information among the nodes.

In addition, unlike the prior art of Document 1, the coordinate system is non-hierarchical. That is, rather than representing different levels of information (such as countries and cities) or different types of information (such as access switches and cell switches) by different dimensions of coordinates, all dimensions of coordinates are parallel. Therefore, there is no need to preset the number of levels and the information represented by each level.

The location information expressing method according to the invention has better accuracy and scalability. The predicted communication delays among nodes express their degree of adjacent on the network. Adjacent data nodes are preferentially selected for file downloading. Thus, performance of download is improved, and the large amount of cross-network traffic caused by random node selection is reduced. The coordinate system is established by calculation based on measured communication delay information among the nodes, without having to know geographic location information and other network topology information of data nodes. Therefore, it has better scalability, and can be applied to a metropolitan area network, an autonomous system (AS) or the entire Internet. In addition, the coordinate system is non-hierarchical, and there is no need to preset the number of levels and the information represented by each level. Therefore, it can be more flexibly and conveniently used.

Figure 3:
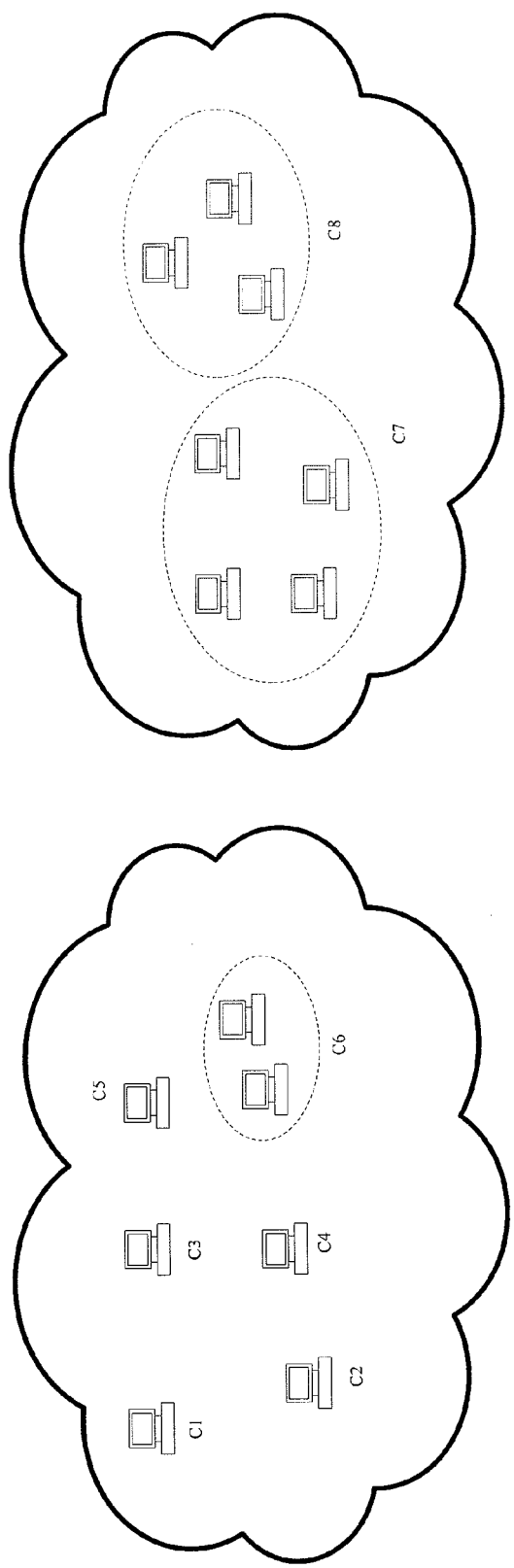
FIG. 3 shows a schematic diagram of choosing different granularities for a coordinate system.

Furthermore, when the system is extended to the entire Internet, the coordinate system may flexibly select different granularities for different networks. For a network for which more information is known (in which more measurements of communication delay can be conducted), coordinate with finer granularity may be used, while for a network for which less information is known, coordinate with coarser granularity may be used, as shown in FIG. 3.

Figure 4:
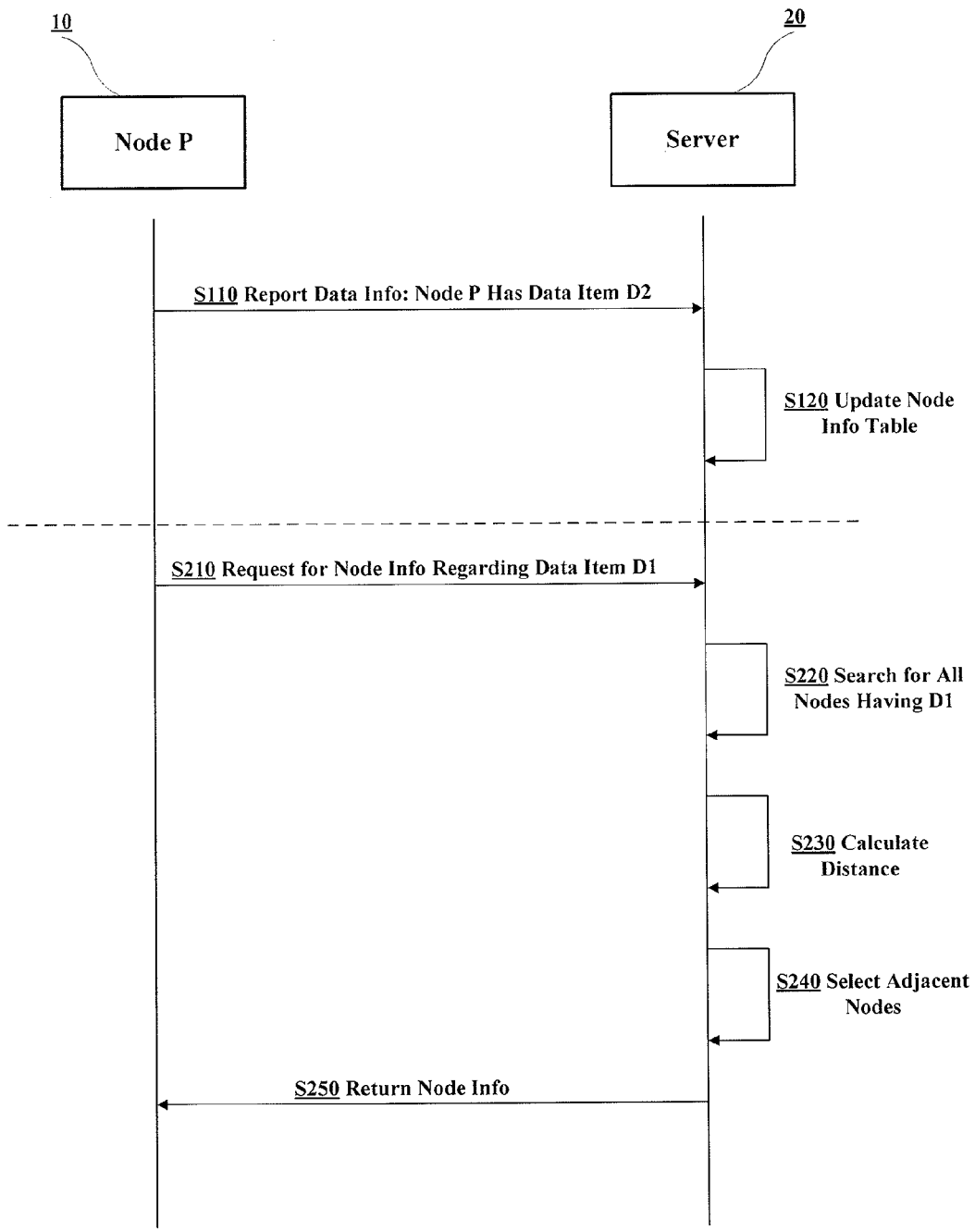
FIG. 4 shows the process flow of a method performed in the system according to the first embodiment of the invention.

FIG. 4 shows the process flow of a method performed in the system 1 according to the first embodiment of the invention.

As shown in FIG. 4, the interaction between the data node 10 and the server 20 may include two parts, i.e., the first part for reporting data information, and the second part for providing node information.

In the first part for reporting data information, in step S110, when the data node 10 has a data item D2 that can be exchanged with other data nodes in the P2P network, the data information reporting unit 103 reports data information indicating that the data node 10 has the data item D2 to the server 20.

Then, in step S120, the node information updating unit 204 of the server 20, upon receipt of the information reported by the data information reporting unit 103 of the data node 10, updates the node information stored in the node information storage unit 201 such that it reflects the received information.

In the second part for providing node information, in step S210, the node information requesting unit 101 of the data node 10 sends a node information request to the server 20 for acquiring information regarding data nodes having a data item D1.

The node information providing unit 203, upon receipt of the node information request from the data node 10, searches for all the data nodes having the data item D1 in the node information storage unit 201 in step S220.

Then, in step S230, the node information providing unit 203 finds in the location information storage unit 202 the coordinate of each of all the data nodes having the data item D1 and the coordinate of the data node 10, and calculates the distance between each of the data nodes having the data item D1 and the data node 10 based on the coordinates found.

Next, in step S240, the node information providing unit 203 selects one or more data nodes from all the data nodes having the data item D1 in ascending order of the calculated distances. These selected data nodes are data nodes most adjacent to the data node 10.

In step S250, the node information providing unit 203 then notifies the data node 10 of the selected adjacent data nodes.

As can be appreciated by those skilled in the art, the relative order of the first part and the second part as described above is merely an example. The first part for reporting data information can also be performed after the second part for providing node information or in parallel thereto. Also, the data node reporting data information and the data node receiving node information provided from the server of course can be different data nodes, and the data items involved may also be the same or different data items.

Figure 5:
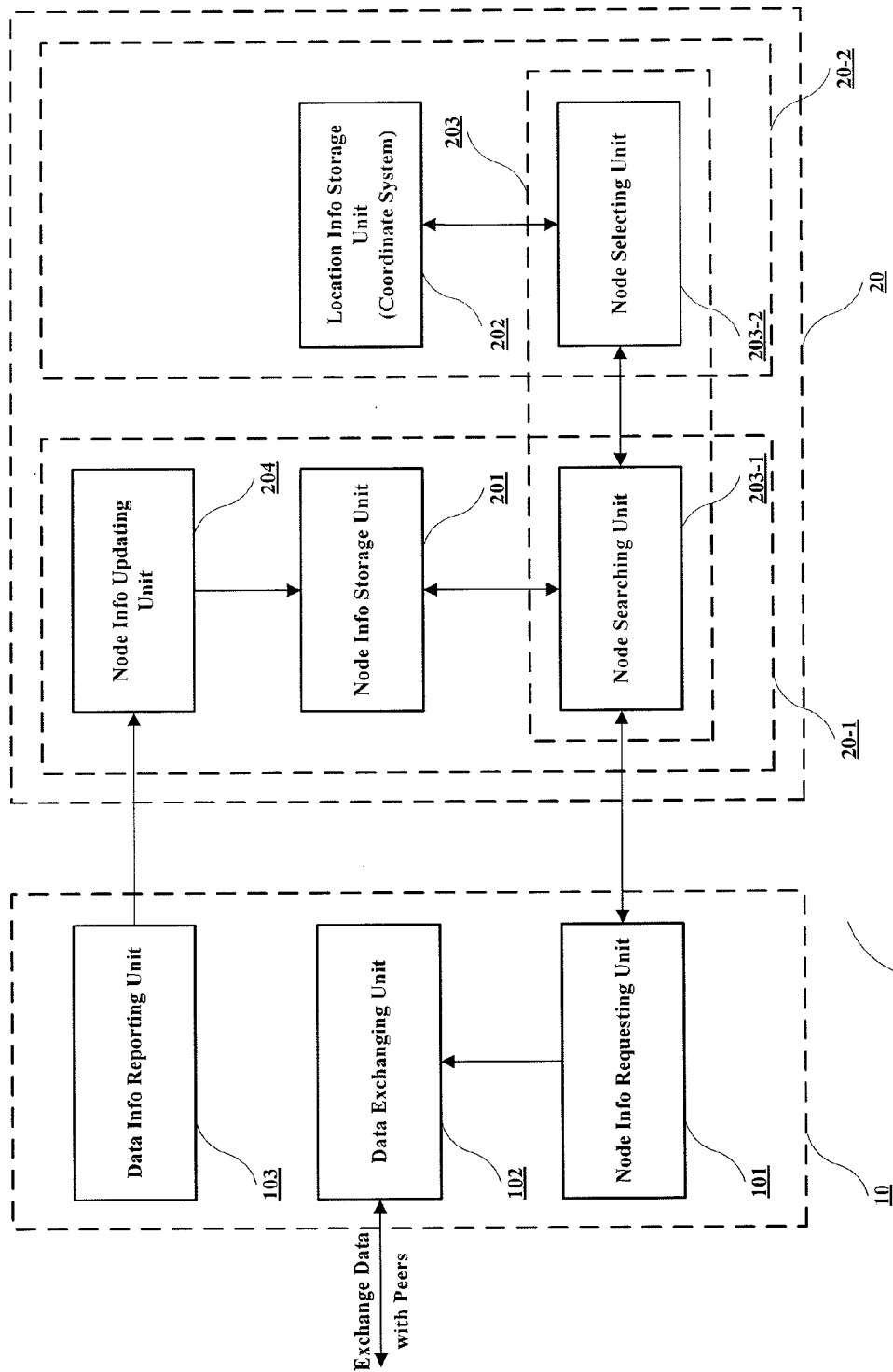
FIG. 5 is a block diagram showing a specific implementation of the system according to the first embodiment of the invention.

FIG. 5 is a block diagram showing a specific implementation of the system 1 according to the first embodiment of the invention.

In the specific implementation shown in FIG. 5, the server 20 is further divided into two servers according to specific functions. That is, the server 20 comprises an indexing server 20-1 and a topology server 20-2. It is to be noted that such a division is generally a logical and functional division, and is not necessarily a physical division. For example, in an implementation, the indexing server 20-1 and topology server 20-2 may be physically at the same location and integrated into one server. In another implementation, the indexing server 20-1 and topology server 20-2 may be two separate servers at different locations.

Accordingly, the node information providing unit 203 may include a node searching unit 203-1 and a node selecting unit 203-2.

The node searching unit 203-1, node information storage unit 201 and node information updating unit 204 may be included in the indexing server 20-1. The node selecting unit 203-2 and the location information storage unit 202 may be included in the topology server 20-2.

The structure of the data node 10 may be the same as that shown in FIG. 2.

The node searching unit 203-1, upon receipt of a request for information of data nodes having the data item D1 from the node information requesting unit 101 in the data node 10, searches for the data nodes having the data item D1 in the node information storage unit 201, and requests the node selecting unit 203-2 to select one or more data nodes adjacent to the data node 10 from the data nodes having the data item D1.

The node selecting unit 203-2, upon receipt of the request from the node searching unit 203-1, finds the coordinate of each of the data nodes having the data item D1 and the coordinate of the data node 10 in the location information storage unit 202, calculates the distance between each of the data nodes having the data item D1 and the data node 10 based on the coordinates found, selects one or more data nodes from the data nodes having the data item D1 in ascending order of the calculated distances, and notifies the node searching unit 203-1 of the selected one or more data nodes.

The node searching unit 203-1 provides information indicating the selected one or more data nodes to the node information requesting unit 101 of the data node 10.

Figure 6:
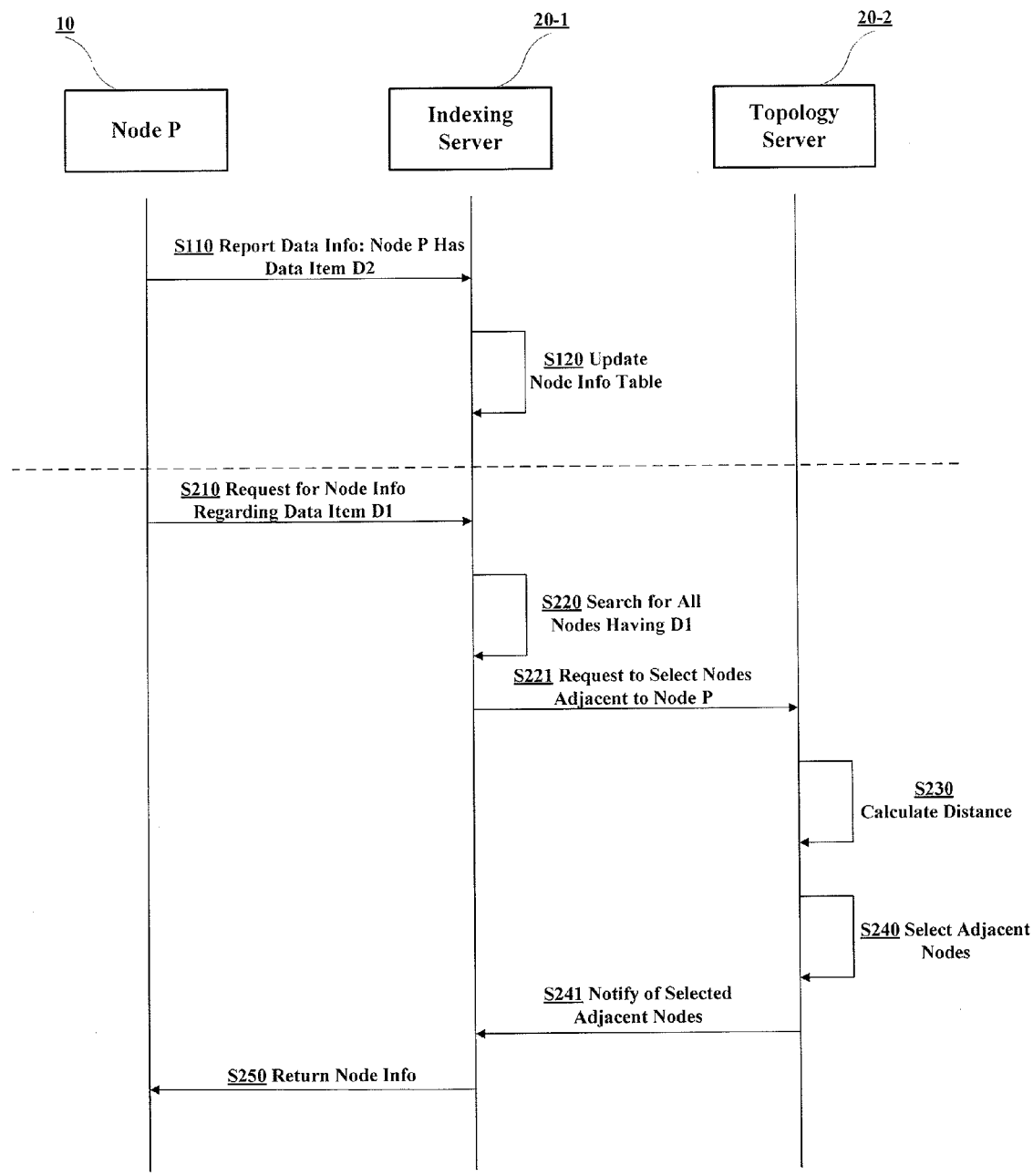
FIG. 6 shows the process flow of a method performed in the system shown in FIG. 5.

FIG. 6 shows the process flow of a method performed in the system shown in FIG. 5.

The first part for reporting data information shown in FIG. 6 is substantially the same as that in FIG. 4, and the description thereof will be omitted here. In addition, similarly, the relative order of the first part and the second part is merely an example. The first part for reporting data information can also be performed after the second part for providing node information or in parallel thereto. Also, the data node reporting data information and the data node receiving node information provided from the server may be different data nodes, and the data items involved may also be the same or different data items.

In the second part for providing node information, in step S210, the node information requesting unit 101 of the data node 10 issues a node information request to the server 20 for acquiring information regarding data nodes having the data item D1.

The node searching unit 203-1 in the node information providing unit 203, upon receipt of the node information request from the data node 10, searches for all the data nodes having the data item D1 in the node information storage unit 201 in step S220.

In the next step S221, the node searching unit 203-1 issues a request to node selecting unit 203-2 to ask node selecting unit 203-2 to select some data nodes from all the data nodes having the data item D1.

Then, in step S230, the node selecting unit 203-2 finds the coordinate of each of the data nodes having the data item D1 and the coordinate of the data node 10 in the location information storage unit 202, and calculates the distance between each of the data nodes having the data item D1 and the data node 10 based on the coordinates found.

Next, in step S240, the node selecting unit 203-2 selects some data nodes from all the data nodes having the data item D1 in ascending order of the calculated distances. These selected data nodes are data nodes most adjacent to the data node 10.

In the next step S241, the node selecting unit 203-2 notifies the node searching unit 203-1 of the one or more data nodes it selected.

In step S250, the node searching unit 203-1 then notifies the data node 10 of the selected adjacent data nodes.

Figure 7:
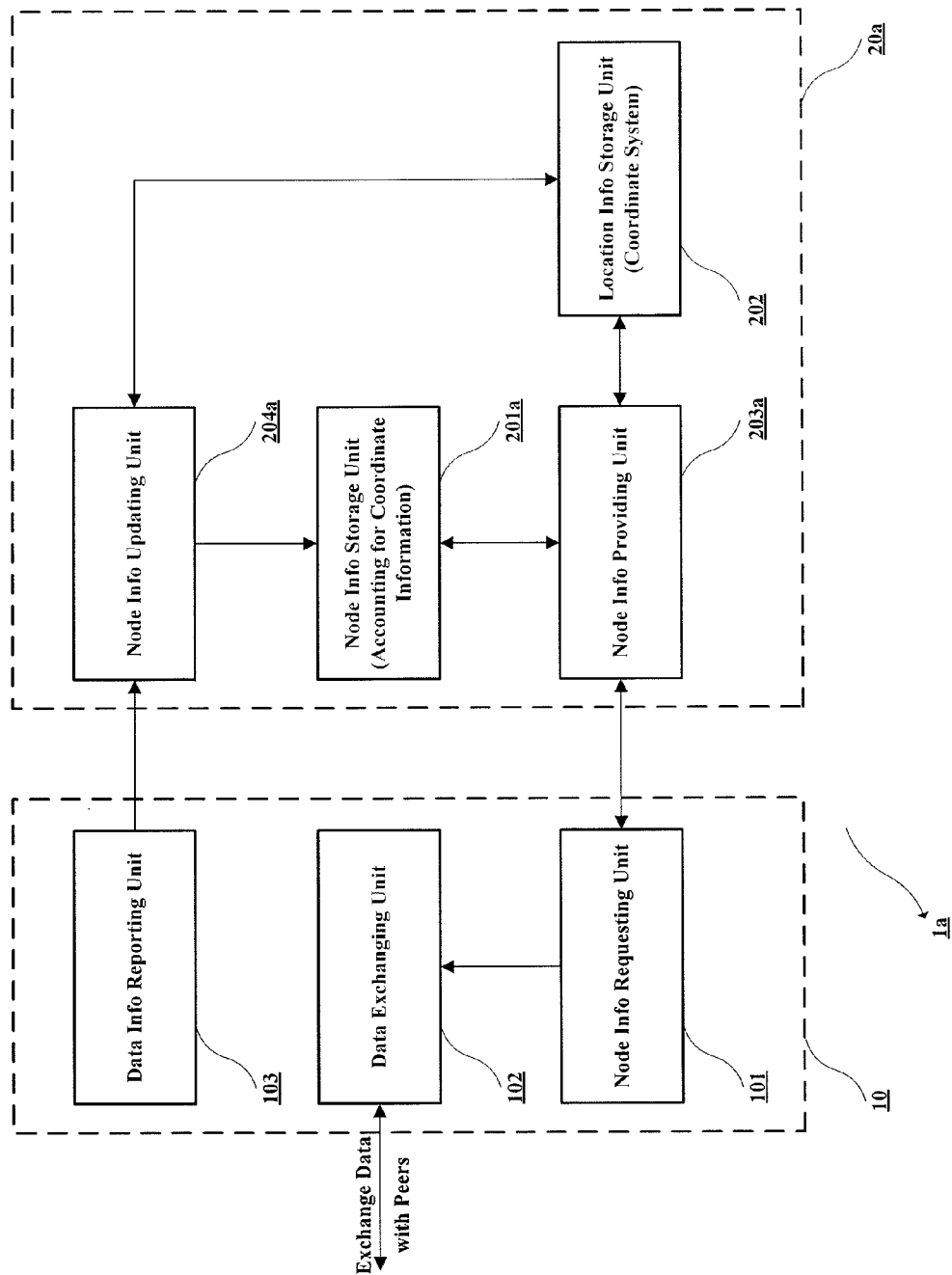
FIG. 7 shows a block diagram of a system according to a second embodiment of the invention.

FIG. 7 shows a block diagram of a system 1a according to a second embodiment of the invention.

The system 1a according to the second embodiment comprises the data node 10 and a server 20a, where the data node 10 can be the same as the data node 10 shown in FIG. 2.

The second embodiment of the invention applies an improved algorithm for selecting adjacent nodes. A problem to be solved when selecting nodes is how, when node P requests for nodes having a data item D1, to find S nodes having data item D1 and adjacent to the requesting node P. According to the first embodiment, all the T nodes $\{P_1, \ldots, P_T\}$ having the data item D1 in the P2P network are found first, then the distance $d_i$=distance $(P, P_i)$ between the requesting node P and every node $\{P_1, \ldots, P_T\}$ having the data item D1 is calculated, and S nodes are selected as nodes adjacent to P in ascending order of $d_i$. Such a method is not efficient when $T \gg S$.

According to the second embodiment, the server 20a includes a node information storage unit 201a, a location information storage unit 202, a node information providing unit 203a, and a node information updating unit 204a.

In the node information stored in the node information storage unit 201a, data nodes having each data item are stored by coordinates of these data nodes in the coordinate system.

Specifically, in the second embodiment, location information is incorporated into the node information table. That is, assuming that $\{P_1, \ldots, P_T\}$ have the data item D1, when such information is stored in the node information table, the information is stored according to the order of the locations of these T nodes in the Euclidean space. When looking for adjacent nodes for the requesting node P, the coordinate of P is used as a starting point, and neighboring nodes of P are found in the Euclidean space. Thus, instead of comparing T nodes, about S nodes will be accessed and compared. When $T \gg S$, the speed for finding adjacent nodes is substantially increased.

The Table 5 below presents an example of a node information table in the case of two-dimensional Euclidean space. As shown, the node information table according to this embodiment includes coordinate information of each node.

TABLE 5

| Node Information Table | | |
| --- | --- | --- |
| Data | Node | Coordinate |
| D1 | P1 | (5, 6) |
| D1 | P2 | (7, 8) |
| D1 | ... | ... |
| D2 | P2 | (7, 8) |
| D2 | P3 | (3, 10) |
| D2 | ... | ... |
| D3 | ... | ... |

Figure 8A:
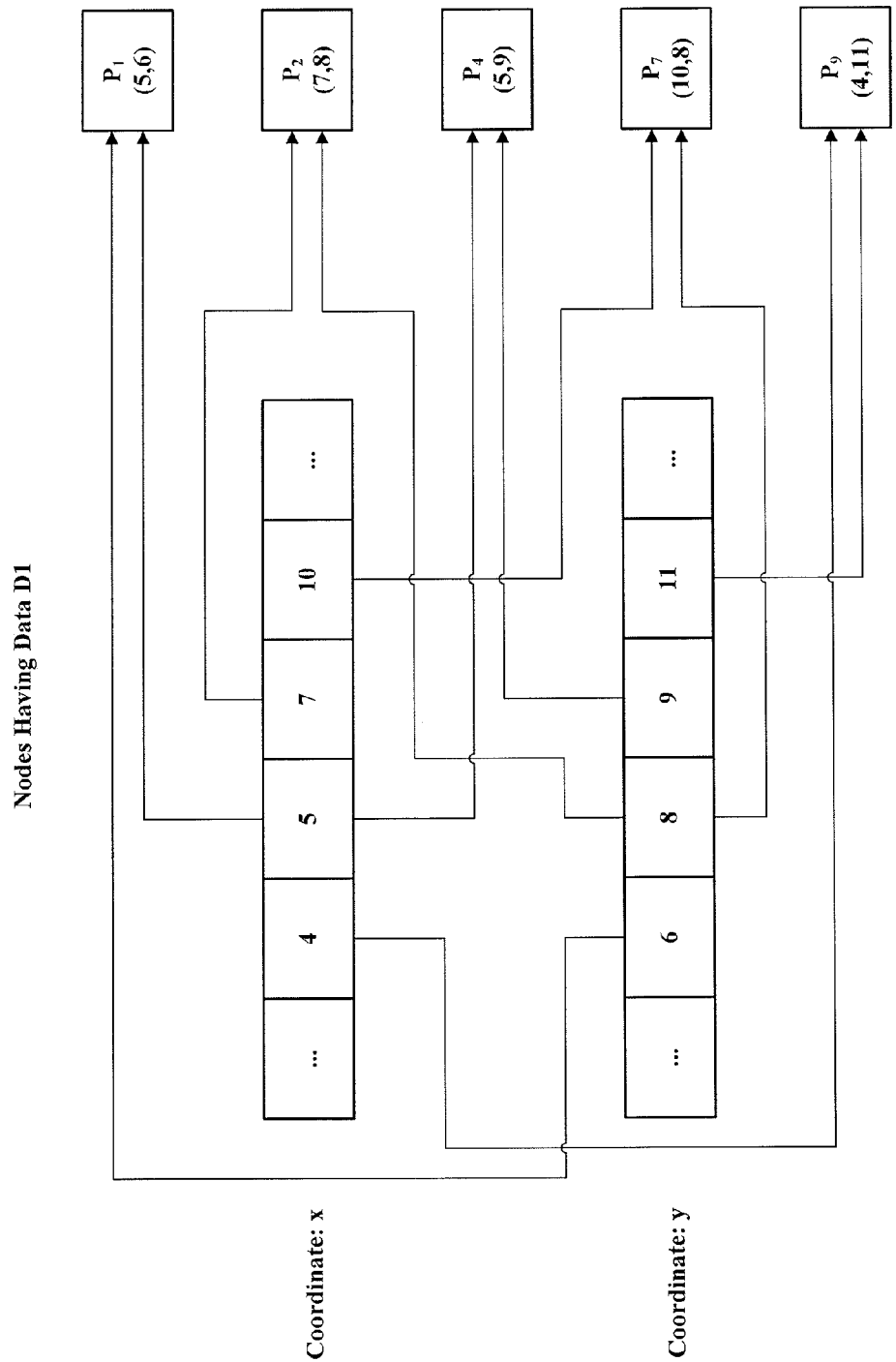
FIG. 8A shows a schematic diagram of the way of storing the node information table in the node information storage unit according to the second embodiment of the invention.

FIG. 8A shows a schematic diagram of the way of storing the node information table in the node information storage unit 201a according to this embodiment. As shown in FIG. 8A, information of all the nodes having the data item D1 is stored in the order of coordinates of each dimension. For example, for the data item D1, two arrays x[ ] and y[ ] may be provided for storing x coordinates and y coordinates of all the nodes having the data item D1 respectively and pointers to corresponding nodes. For example, the $i^{th}$ element of array x[ ] stores the $i^{th}$ x coordinate $x_i$ among the x coordinates of all the nodes having the data item D1 and one or more pointers to information of all the nodes with an x coordinate of $x_i$ among the nodes having the data item D1. Similarly, the $j^{th}$ element of array y[ ] stores the $j^{th}$ y coordinate $y_j$ among the y coordinates of all the nodes having the data item D1 and one or more pointers to information of all the nodes with a y coordinate of $y_j$ among the nodes having the data item D1.

Figure 8B:
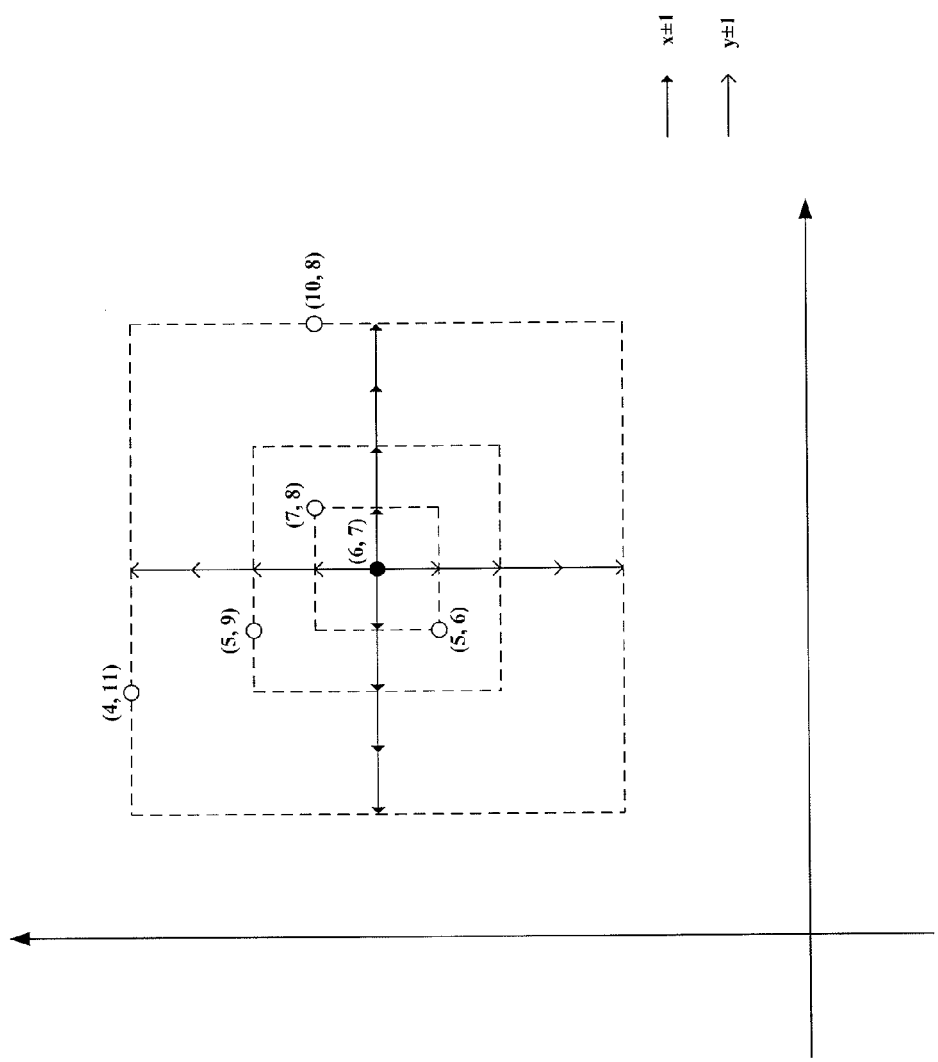
FIG. 8B shows a schematic diagram of sequentially selecting data nodes by the node information providing unit according to the second embodiment of the invention.

Accordingly, the node information updating unit 204a, upon receipt of information reported by a data node (such as the data node 10) as to it has a data item (such as a data item D2), will first find the coordinate of the data node 10 in the location information storage unit 202, and, in accordance with the coordinate found, add the received information together with the coordinate of the node as the information for this node to the node information stored in the node information storage unit, such that the node information table added with the information for this node is still stored in coordinates in the manner as described above. In addition, the node information providing unit 203a, upon receipt of a request for information of data nodes having a data item (such as the data item D1) from a data node (such as the data node 10, i.e. node P), will find the coordinate of the data node 10 in the location information storage unit 202 and sequentially select data nodes in the coordinate system with the coordinate of the data node 10 as a starting point from the data nodes having the data item D1 listed in the node information stored in the node information storage unit 201a. FIG. 8B shows a schematic diagram of sequentially selecting data nodes by the node information providing unit 203a in the form of a coordinate space. Assuming that a node P with a coordinate of (6, 7) requests for S=5 nodes that have data item D1, in the node information storage unit 201a storing node information in the manner shown in FIG. 8A for example, the node information providing unit 203a starts with the coordinate of node P and gradually extends in two directions in each dimension. The nodes in the covered area are neighboring nodes of node P. When enough neighboring nodes are found (for example, when the number of nodes reaches a specified number or the distance reaches a threshold), the extension is stopped.

For example, the node information providing unit 203a first check whether there is an element in the x[ ] array as described above that stores a x coordinate =6 and at the same time there is an element in the y[ ] array that stores a y coordinate =7 and the pointers stored in these two elements are pointing to the same node. If so, then this means that there is another node with a coordinate of (6, 7) that has the data item D1, and this node can be selected. In the case shown in FIGS. 8A and 8B, no such nodes exist.

Then, it may be checked whether there is an element in the x[ ] array that stores a x coordinate =6 and at the same time there is an element in the y[ ] array that stores a y coordinate =6 and the pointers stored in these two elements are pointing to the same node. If so, then this means that there is another node with a coordinate of (6, 6) that has the data item D1, and this node can be selected. In the case shown in FIGS. 8A and 8B, no such nodes exist.

Then, it may be checked whether there is an element in the x[ ] array that stores a x coordinate =6 and at the same time there is an element in the y[ ] array that stores a y coordinate =8 and the pointers stored in these two elements are pointing to the same node. If so, then this means that there is another node with a coordinate of (6, 8) that has the data item D1, and this node can be selected. In the case shown in FIGS. 8A and 8B, no such nodes exist.

Then, it may be checked whether there is an element in the x[ ] array that stores a x coordinate =5 and at the same time there is an element in the y[ ] array that stores a y coordinate =7 and the pointers stored in these two elements are pointing to the same node. If so, then this means that there is another node with a coordinate of (5, 7) that has the data item D1, and this node can be selected. In the case shown in FIGS. 8A and 8B, no such nodes exist.

Then, it may be checked whether there is an element in the x[ ] array that stores a x coordinate =7 and at the same time there is an element in the y[ ] array that stores a y coordinate =7 and the pointers stored in these two elements are pointing to the same node. If so, then this means that there is another node with a coordinate of (7, 7) that has the data item D1, and this node can be selected. In the case shown in FIGS. 8A and 8B, no such nodes exist.

Then, it may be checked whether there is an element in the x[ ] array that stores a x coordinate =5 and at the same time there is an element in the y[ ] array that stores a y coordinate =6 and the pointers stored in these two elements are pointing to the same node. If so, then this means that there is another node with a coordinate of (5, 6) that has the data item D1, and this node can be selected. As shown in FIGS. 8A and 8B, a node $P_1$ (5, 6) is found at this point. Thus this node is selected as a node having the data item D1 and being most adjacent to node P.

Then, it may be checked whether there is an element in the x[ ] array that stores a x coordinate =5 and at the same time there is an element in the y[ ] array that stores a y coordinate =8 and the pointers stored in these two elements are pointing to the same node. If so, then this means that there is another node with a coordinate of (5, 8) that has the data item D1, and this node can be selected. In the case shown in FIGS. 8A and 8B, no such nodes exist.

Then, it may be checked whether there is an element in the x[ ] array that stores a x coordinate =7 and at the same time there is an element in the y[ ] array that stores a y coordinate =6 and the pointers stored in these two elements are pointing to the same node. If so, then this means that there is another node with a coordinate of (7, 6) that has the data item D1, and this node can be selected. In the case shown in FIGS. 8A and 8B, no such nodes exist.

Then, it may be checked whether there is an element in the x[ ] array that stores a x coordinate =7 and at the same time there is an element in the y[ ] array that stores a y coordinate =8 and the pointers stored in these two elements are pointing to the same node. If so, then this means that there is another node with a coordinate of (7, 8) that has the data item D1, and this node can be selected. As shown in FIGS. 8A and 8B, another node $P_2$ (7, 8) is found at this point. Thus this node is selected as a node having the data item D1 and being adjacent to node P.

In this manner, nodes $P_4$ (5, 9), $P_7$ (10, 8) and $P_9$ (4, 11) are found in sequence. At this time, 5 nodes having the data item D1 and being relatively close to node P have been found. Then the information for these 5 nodes is included in the node information to be returned to the data node P that issued the request.

As described above, in the node information table stored in the node information storage unit 201a, the nodes are stored according to the order of values of coordinates of each dimension thereof. Thus, neighboring nodes can be conveniently found for a specified node.

Figure 9:
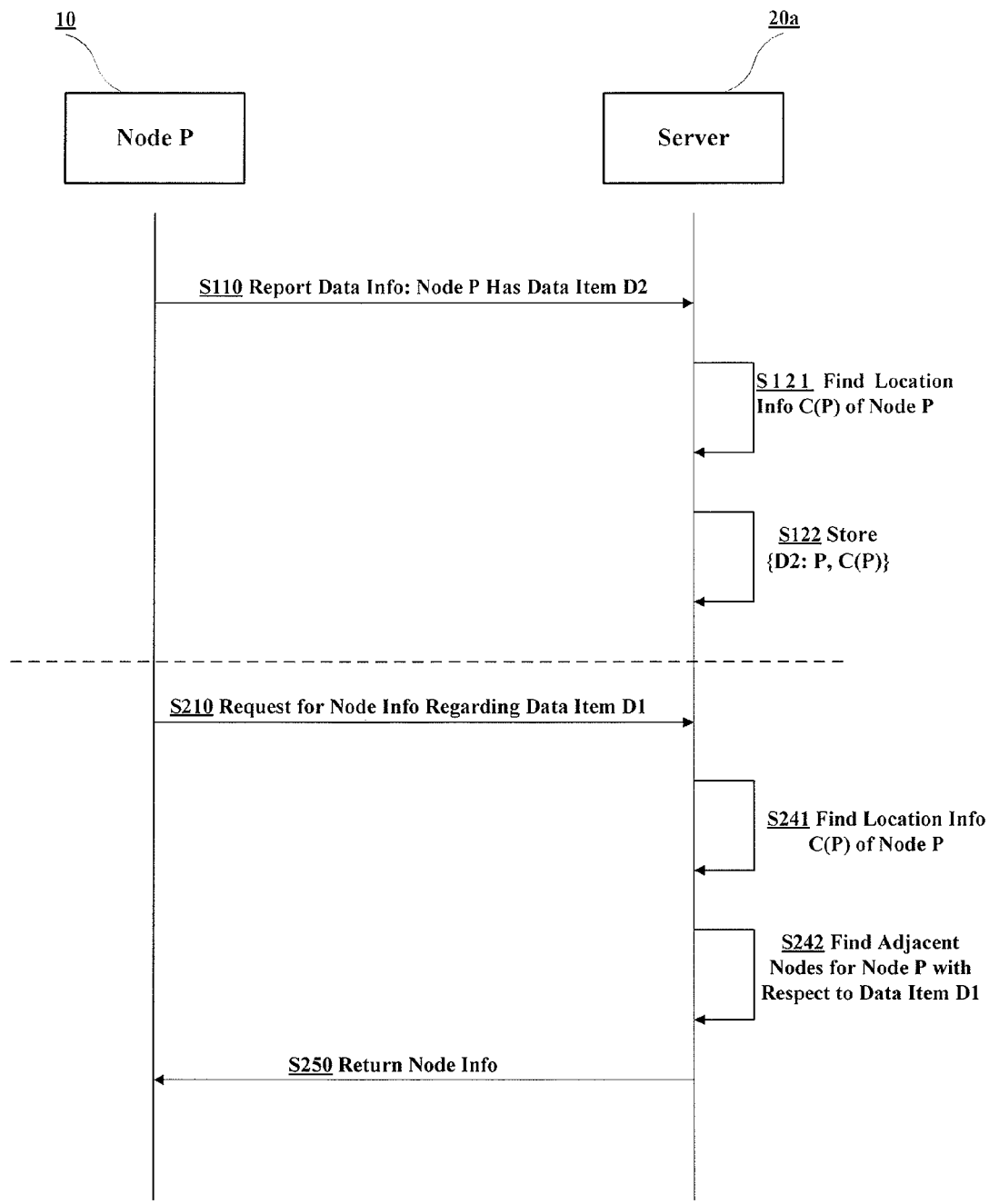
FIG. 9 shows the process flow of a method performed in the system according to the second embodiment of the invention.

FIG. 9 shows the process flow of a method performed in the system 1a according to the second embodiment of the invention.

As shown in FIG. 9, similarly as in FIG. 4, the interaction between the data node 10 and the server 20a may include two parts, i.e., the first part for reporting data information, and the second part for providing node information.

In the first part for reporting data information, in step S110, when the data node 10 has a data item D2 that can be exchanged with other data nodes in the P2P network, the data information reporting unit 103 reports data information indicating that the data node 10 has the data item D2 to the server 20.

In the next step S121, the node information updating unit 204a of server 20a, upon receipt of the information reported by the data information reporting unit 103 of data node 10, stores in the location information storage unit 202 the location information of the data node 10, i.e., coordinate C(P).

In step S122, the node information updating unit 204a adds the received information to the node information stored in the node information storage unit according to the coordinate found, such that the data node 10 is arranged among the data nodes having the data item D2 based on its coordinate.

In the second part, when the node information providing unit 203a receives the request for acquiring information regarding data nodes having the data item D1 sent from the data node 10 in step S210, the node information providing unit 203a finds the coordinate C(P) of the data node 10 in the location information storage unit 202 in step S241.

In step S242, the node information providing unit 203a sequentially selects data nodes from the data nodes having the data item D1 listed in the node information stored in the node information storage unit 201a with the coordinate of the data node 10 as a starting point.

In step S250, the node information providing unit 203a notifies the data node 10 of the selected data nodes.

Again, as can be appreciated by those skilled in the art, the relative order of the first part and the second part as described above is merely an example. The first part for reporting data information can also be performed after the second part for providing node information or in parallel thereto. Also, the data node reporting data information and the data node receiving node information provided from the server may be different data nodes, and the data items involved may also be the same or different data items.

Figure 10:
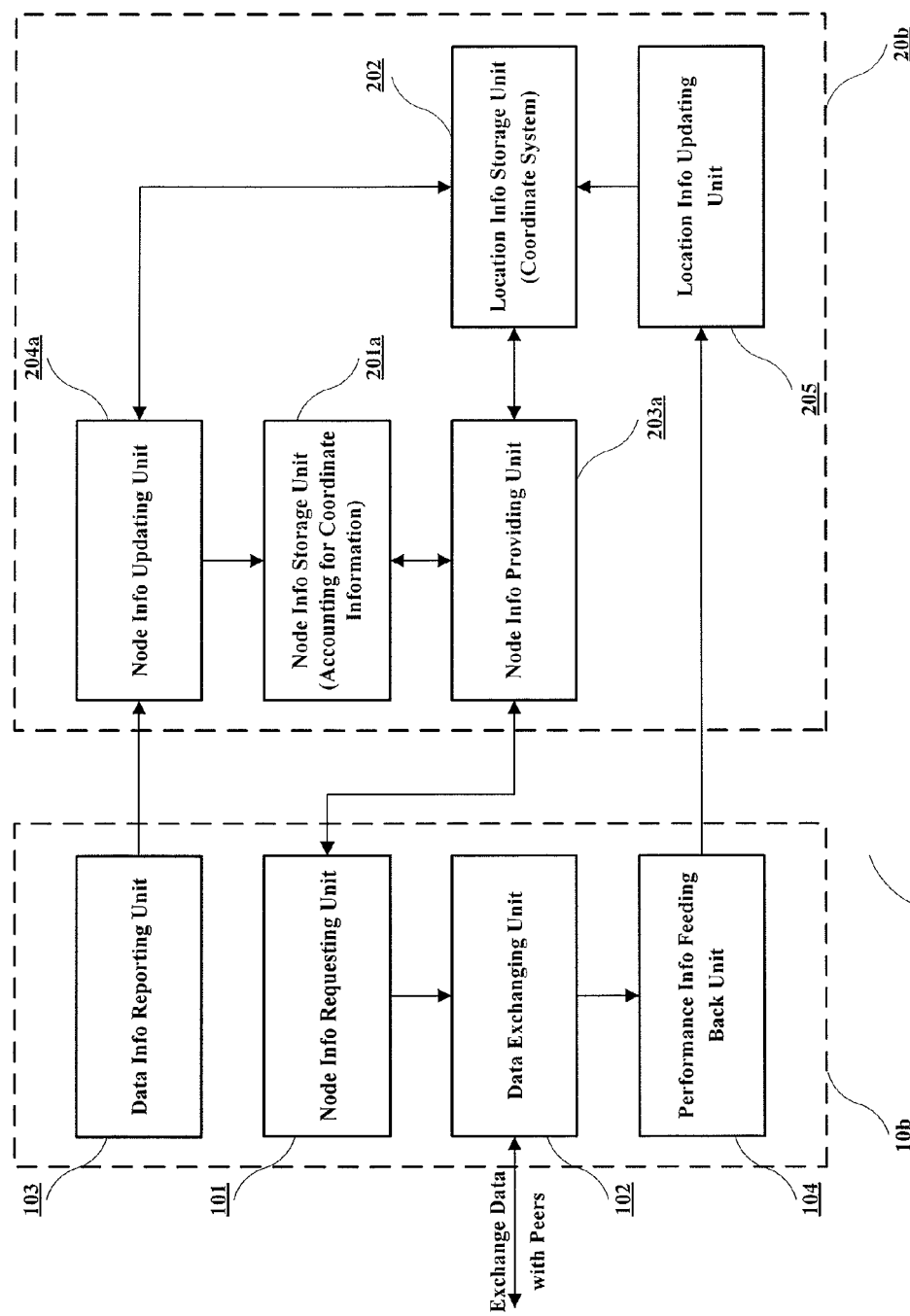
FIG. 10 shows a block diagram of a system according to a third embodiment of the invention.

FIG. 10 shows a block diagram of a system 1b according to a third embodiment of the invention.

When the coordinate system is initially established, communication delays can only be measured among some of the nodes. During the process of running the system, more communication delay information can be measured and acquired. Therefore, the location information table may be updated according to the condition of the network. A specific method includes nodes collecting performance information (communication delay, bandwidth, etc.) reflecting the condition of data exchange and feeding it back to the server for updating location information of nodes.

The system 1b according to the third embodiment includes a data node 10b and a server 20b.

The data node 10b includes a performance information feeding back unit 104 in addition to the node information requesting unit 101, the data exchanging unit 102 and the data information reporting unit 103.

The performance information feeding back unit 104 collects performance information indicating conditions of data item exchanging between the data node 10b and other data nodes and feeds it back to the server 20b. The performance information is performance statistics acquired during the data item exchanging between the data node 10b and other data nodes, and includes for example communication delay, bandwidth, and the like.

Accordingly, the server 20b includes a location information updating unit 205. The location information updating unit 205, upon receipt of the information fed back from the performance information feeding back unit 104 of the data node 10b, updates the coordinate information stored in the location information storage unit 202 based on the received information. The method for updating the coordinate information based on the communication delay included in the received information is similar as the method for calculating the coordinate information based on communication delay as described above.

Figure 11:
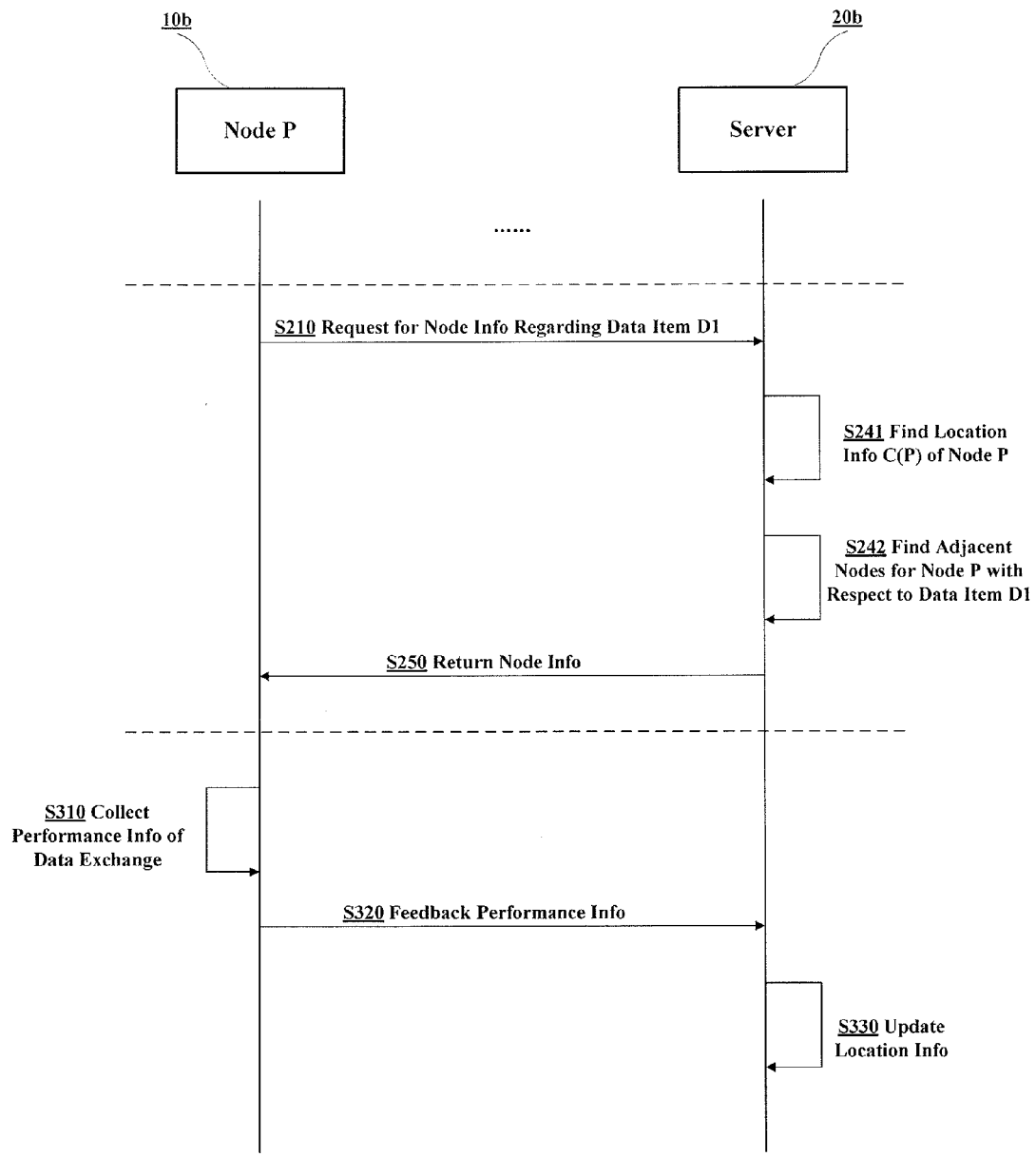
FIG. 11 shows the process flow of a method performed in the system according to the third embodiment of the invention.

FIG. 11 shows the process flow of a method performed in the system 1b according to the third embodiment of the invention.

As shown in FIG. 11, the interaction between the data node 10b and the server 20b may be divided into three parts, i.e., the first part for reporting data information, the second part for providing node information, and the third part for updating location information.

The first part and the second part are the same as those shown in FIG. 9, and the description thereof will be omitted here.

In the third part, in step S310, the performance information feeding back unit 104 collects performance information reflecting conditions of data item exchanging between the data node 10b and other data nodes.

In step S320, the performance information feeding back unit 104 feeds back the collected performance information to the server 20b.

In step S330, the location information updating unit 205 of the server 20b, upon receipt of the information fed back from the performance information feeding back unit 104 of the server 20b, updates the coordinate information stored in the location information storage unit 202 based on the received information.

Again, as can be appreciated by those skilled in the art, the relative order of the first part, the second part and the third part as described above is merely an example. The first part, the second part, and the third part can also be performed in other order or in parallel. Also, the data node reporting data information, the data node receiving node information provided from the server, and the node feeding back performance information may be different data nodes, and the data items involved may also be the same or different data items.

Although some specific embodiments of the invention have been described, those skilled in the art can appreciate that various modifications, combinations and alterations may be made to the invention, and the invention covers such modifications, combinations and alterations as fall within the scope of the appended claims.

For example, while FIG. 5 shows a specific implementation of the first embodiment, such a specific implementation can also be applied to the second embodiment and the third embodiment.

The invention claimed is:

1. A server in a peer-to-peer (P2P) network, comprising at least one processor which implements:
a location information storage unit which stores coordinate information indicating a coordinate of each data node in the P2P network in a coordinate system that is created based on communication delays among data nodes in the P2P network; and a node information providing unit which, upon receipt of a request for information on data nodes having a first data item, selects one or more data nodes from data nodes having the first data item based on the coordinate information stored in the location information storage unit, and provides information indicating the selected one or more data nodes, wherein the P2P network includes M data nodes $\{H_1, \ldots, H_M\}$, M being an integer greater than 1, and the coordinate system is created such that $$F = \sum_{H_i, H_j \in \{H_1, \ldots, H_M\}} Err(L_{ij}, d_{ij})$$

is minimized, where Err( ) is an error function, $L_{ij}$ is a distance based on the measured communication delay between two data nodes $H_i$ and $H_j$, and $d_{ij}$ is an Euclidean distance between the coordinates of the two data nodes $H_i$ and $H_j$ in the coordinate system.

2. The server according to claim 1, wherein the node information providing unit includes a node selecting unit which finds the coordinate of each of the data nodes having the first data item and the coordinate of a first data node from the location information storage unit, calculates the distance between each of the data nodes having the first data item and the first data node based on the coordinates found, and selects one or more data nodes from the data nodes having the first data item in ascending order of the calculated distances.

3. The server according to claim 1, wherein the at least one processor further implements a node information storage unit which, for each data item, stores node information indicating data nodes having the data item in the P2P network.

4. The server according to claim 3, wherein the node information providing unit includes a node searching unit which searches in the node information storage unit for data nodes having the first data item.

5. The server according to claim 3, wherein the at least one processor further implements a node information updating unit which, upon receiving information indicating that a first data node has a second data item, adds the received information into the node information stored in the node information storage unit.

6. The server according to claim 3, wherein
in the node information stored in the node information storage unit, data nodes having each data item are arranged by coordinates of the data nodes in the coordinate system; and
the node information providing unit, upon receipt of the request, finds the coordinate of a first data node in the location information storage unit, and sequentially selects one or more data nodes from the data nodes having the first data item arranged in the node information stored in the node information storage unit, with the coordinate of the first data node as a starting point.

7. The server according to claim 5, wherein
in the node information stored in the node information storage unit, data nodes having each data item are arranged by coordinates of the data nodes in the coordinate system; and
the node information updating unit, upon receipt of the information, finds the coordinate of the first data node in the location information storage unit, and adds the received information to the node information stored in the node information storage unit in accordance with the coordinate found, such that the first data node is arranged among the data nodes having the second data item based on the coordinate of the first data node.

8. The server according to claim 1, wherein the at least one processor further implements a location information updating unit which, upon receipt of performance information fed back from a first data node indicating a condition of data item exchanging between the first data node and other data nodes, updates the coordinate information stored in the location information storage unit based on the received performance information.

9. A method of providing node information in a peer-to-peer (P2P) network, comprising the steps of:
receiving a request for information on data nodes having a first data item;
selecting one or more data nodes from data nodes having the first data item based on coordinate information; and
providing information indicating the selected one or more data nodes, wherein
the coordinate information indicates a coordinate of each data node in the P2P network in a coordinate system that is created based on communication delays among data nodes in the P2P network, and
wherein the P2P network includes M data nodes $\{H_1, \ldots, H_M\}$, M being an integer greater than 1, and the coordinate system is created such that $$F = \sum_{H_i, H_j \in \{H_1, \ldots, H_M\}} Err(L_{ij}, d_{ij})$$

is minimized, where Err( ) is an error function, $L_{ij}$ is a distance based on the measured communication delay between two data nodes $H_i$ and $H_j$, and $d_{ij}$ is an Euclidean distance between the coordinates of the two data nodes $H_i$ and $H_j$ in the coordinate system.

10. The method according to claim 9, wherein the selecting the one or more data nodes includes:
searching for data nodes having the first data item in node information indicating data nodes having each data item;
finding the coordinate of each of the data nodes having the first data item and the coordinate of a first data node based on the coordinate information;
calculating the distance between each of the data nodes having the first data item and the first data node based on the coordinates found; and
selecting one or more data nodes from the data nodes having the first data item in ascending order of the calculated distances.

11. The method according to claim 9, further comprising:
upon receiving information indicating that a first data node has a second data item, adding the received information into node information indicating data nodes having each data item, and wherein
in node information indicating data nodes having each data item, data nodes having each data item are arranged by coordinates of the data nodes in the coordinate system; and
the adding the received information into the node information includes:
finding the coordinate of the first data node based on the coordinate information; and
adding the received information to the node information in accordance with the coordinate found, such that the first data node is arranged among the data nodes having the second data item based on the coordinate of the first data node.

12. The method according to claim 9, wherein in node information indicating data nodes having each data item, data nodes having each data item are arranged by coordinates of the data nodes in the coordinate system; and the selecting the one or more data nodes includes:

finding the coordinate of a first data node based on the coordinate information; and sequentially selecting one or more data nodes from among the data nodes having the first data item arranged in the node information, with the coordinate of the first data node as a starting point.

13. A system for providing node information in a peer-to-peer (P2P) network, comprising:

a data node including at least one processor which implements:

a node information requesting unit which sends to a server a request for information on data nodes having a first data item; and a data exchanging unit which exchanges the first data item with data nodes indicated in the information provided by the server; and the server including at least one processor which implements:

a location information storage unit which stores coordinate information indicating a coordinate of each data node in the P2P network in a coordinate system that is created based on communication delays among data nodes in the P2P network; and a node information providing unit which, upon receipt of the request for the information on the data nodes having the first data item from said data node, selects one or more data nodes from data nodes having the first data item based on the coordinate information stored in the location information storage unit, and provides information indicating the selected one or more data nodes to said data node, wherein the P2P network includes M data nodes $\{H_1, \ldots, H_M\}$, M being an integer greater than 1, and the coordinate system is created such that $$F = \sum_{H_i, H_j \in \{H_1, \ldots, H_M\}} Err(L_{ij}, d_{ij})$$

is minimized, where Err( ) is an error function, $L_{ij}$ is a distance based on the measured communication delay between two data nodes $H_i$ and $H_j$, and $d_{ij}$ is an Euclidean distance between the coordinates of the two data nodes $H_i$ and $H_j$ in the coordinate system.

* * * * *